US012736494B2

(12) United States Patent
Nelen

(10) Patent No.: US 12,736,494 B2
(45) Date of Patent: Sep. 15, 2026

(54) APPARATUS TO ENAMEL RATE SELECTED REGIONS OF METAL OBJECTS

(71) Applicant: INNOSEN LIMITED, Hong Kong (CN)

(72) Inventor: Lucien Nelen, Hong Kong (CN)

(73) Assignee: INNOSEN LIMITED, Hong Kong (CN)

( * ) Notice: Subject to any disclaimer, the term of this patent is extended or adjusted under 35 U.S.C. 154(b) by 206 days.

(21) Appl. No.: 18/711,669

(22) PCT Filed: Dec. 2, 2022

(86) PCT No.: PCT/EP2022/084169
§ 371 (c)(1),
(2) Date: May 20, 2024

(87) PCT Pub. No.: WO2023/099718
PCT Pub. Date: Jun. 8, 2023

(65) Prior Publication Data
US 2025/0012749 A1 Jan. 9, 2025

(30) Foreign Application Priority Data
Dec. 2, 2021 (GB) .................................... 2117426

(51) Int. Cl.
*G01N 27/20* (2006.01)

(52) U.S. Cl.
CPC .................................. *G01N 27/205* (2013.01)

(58) Field of Classification Search
CPC .... G01N 27/205; G01N 27/06; G01N 27/005; G01N 27/26; G01N 27/28; G01N 27/404; G01N 27/413; G01N 27/42
See application file for complete search history.

(56) References Cited

U.S. PATENT DOCUMENTS 4,206,407 A 6/1980 Bender
4,846,936 A 7/1989 Tsurumaru et al.
2023/0333032 A1* 10/2023 Nakamura ........... G01N 27/404

FOREIGN PATENT DOCUMENTS

CN 111929351 A * 11/2020 ............. G01N 27/48
CN 113690825 A * 11/2021 ............... H02G 7/05
(Continued)

OTHER PUBLICATIONS

Machine translation of JPH0674930A (Year: 1994).*
(Continued)

*Primary Examiner* — Lee E Rodak
*Assistant Examiner* — Jeremiah J Barron
(74) *Attorney, Agent, or Firm* — Neil D. Gershon

(57) ABSTRACT

An apparatus to enamel rate a selected region of a metal object, such as the rivet area of a lid 40 of a food or beverage container by the adaption of a lid of an electrolyte vessel to direct electrolyte specifically to an area T that requires testing, with the rest of the object being kept dry and separate from the area to be tested. The vessel plate has a main body 16 configured as a lid for attachment to a test chamber and an adapter 20 configured to receive the metal object therein, the adapter having a base 21 and a perimeter wall 23 extending outwardly from the plate, the perimeter wall having a seal 22 mounted thereon, the base of the adapter having at least one aperture 28 surrounded by a secondary seal 24.

17 Claims, 8 Drawing Sheets

(56) References Cited

FOREIGN PATENT DOCUMENTS

| | | | |
|---|---|---|---|
| CN | 214793744 U | * | 11/2021 |
| JP | H03-176655 | | 7/1991 |
| JP | H06-50926 | | 2/1994 |
| JP | H06-74930 | | 3/1994 |

OTHER PUBLICATIONS

Machine translation of CN214793744U (Year: 2021).*
Machine translation of JPH0650926 (Year: 1994).*
Machine translation of CN113690825A (Year: 2021).*
Machine translation of CN111929351A (Year: 2020).*
International Search Report and Written Opinion Fort Application PCT/EP2022/084l69. Date Mailed: Feb. 27, 2023.

* cited by examiner 20
30
22
21
26
21a
16
25
28
24

18
26
21a
28
24
25
16
30
21
22
23

T
26f
18
16
26s
27
40
20

40
26f
18
26s
27
16
20

20
24
T
40
16
22
12
32
28
50
15

32
20
22
24
28
T
40
15
50
16
12

15

32
50
28
12
22
50
16
40
T
24

154
150
160
400
220
152
200
12
150

154
154
150
160
150
152
400
220
200

150
400
220
150
160

APPARATUS TO ENAMEL RATE SELECTED REGIONS OF METAL OBJECTS

FIELD OF THE INVENTION

The present invention relates generally to an enamel rater, being an apparatus to enamel rate selected regions of metal objects, such as metal containers including food and beverage containers and their lids.

BACKGROUND

Enamel raters are gauges known in the art for checking the integrity of coatings on metal packaging such as flat sheets, cans, tubes, lids and ends by testing for metal exposure. The instrument applies a constant voltage across the container body having an electrolyte such as saline solution pumped into the container, such as a metal can. An electrode is placed into the solution with spikes or blades contacting the outside of the can. The enamel rater uses electrolysis to detect a current between the electrode and the blades. The coating or lacquer acts as insulation to prevent any current but if there are scratches or pin holes in the coating, current is able to pass between the electrode and spikes or blades. This may be measured quantitatively and displayed via a digital or analog reader or may be visualised by the formation of bubbles in the area of damage. In this respect, the location of exposed metal can be determined by reversing the voltage causing bubbles of gas to form on any exposed metal for easy visual identification. Various other components may be included in the apparatus, such as electrolyte level and container contact sensors to ensure that testing starts once a container is properly filled with electrolyte solution and good electrical contact is established.

These types of apparatus do have their limitations. If bubbles are relied on to identify a defect, the production of only a small current may enable the bubbles to dissolve in the electrolyte. As a result, it would not be possible to establish the location of the defect. This is especially prominent if damage to the lacquer comprises many pinholes rather than a large defect (such as a scratch), a reasonable current may be generated but no bubbles may be visible. It is desirable to know the area of the defect so that the manufacturing process can be adjusted in such a way that the defect will no longer occur. If it is not possible to establish the location of the defect, it is difficult to know what and/or how to improve the manufacturing process to produce a better product.

Furthermore, it is more difficult to enamel rate lids because it is harder to get the conductive solution to cover the inside of the lid. This is generally resolved by using a measurement vessel with a conductive liquid. The vessel has an opening on top with a seal around it and the lid fits into the seal. Once the lid is fitted, a vacuum is applied to the vessel and the atmospheric pressure holds the lid firmly onto the vessel while the vessel is turned upside down. The liquid now flows on top of the lid. An electrode penetrates the vessel wall and is immersed in the liquid. An outside contact is made with the lid and a voltage is applied. If current is detected, this indicated that the metal of the lid has been exposed by damage occurring to the lacquer coating.

It is now commonplace for food and beverage containers to be provided with easy opening ends or lids, for example being provided with a ring pull to facilitate opening of the container without the need for any additional tools. The deformation of metal around these parts of easy opening ends/lids, where the ring pull is riveted to the end itself, is more extreme which may result in the lacquer coating cracking to expose the metal underneath. However, current enamel raters cannot focus on this area of the container but instead test the integrity of the entire lid as described above.

As explained above, as it is not always possible to identify the area of the defect by relying on bubbles so the testing of an entire lid means that it is not always possible to pinpoint the location of the defect.

It is an object of the present invention to provide an improved enamel rater that overcomes, or at least alleviates, the abovementioned problems.

SUMMARY OF THE INVENTION

According to a first aspect of the present invention there is provided enamel rater vessel plate for attachment to a test chamber of an enamel rater apparatus, the vessel plate comprising a main body configured as a lid for attachment to a test chamber and an adapter configured to receive a metal object therein, the adapter comprising a base and a perimeter wall extending outwardly from the plate, the perimeter wall having a seal mounted thereon, the base of the adapter having at least one aperture surrounded by a secondary seal.

A second aspect of the present invention provides an end adapter of an enamel rater apparatus, the end adapter incorporating a vessel plate according to the first aspect of the present invention. To this end, the end adapter of the enamel rater apparatus comprises a test chamber for receiving an electrolyte therein, an electrode extending into the electrolyte and an enamel rater vessel plate comprising a main body having at least one fastener for securely attaching the plate to the test chamber, the vessel plate having an adapter secured to the main body, the adapter being configured to receive a metal object, the adapter comprising a base and a perimeter wall extending outwardly from the main body, the perimeter wall having a seal mounted thereon and the base of the adapter having at least one aperture surrounded by a secondary seal.

Generally, the vessel plate is substantially planar and normally corresponds to the shape of the test chamber, serving as a closure lid. For example, the test chamber may comprise a cylindrical vessel and the vessel plate is circular. However, it is appreciated that the chamber vessel and plate may be provided in any configurations. The fastener for securing the vessel plate to the test chamber may be any suitable fastener, such as a mechanical fastener, but preferably comprises as least one magnet. The adapter for receipt of an object is generally shaped to correspond with the shape of the metal object to be received in the adapter, for example being ovoid, circular or otherwise.

The chamber vessel may be provided with a stand which is preferably manually or automatically rotatable, thereby enabling inversion of the chamber vessel. The electrode is preferably a non-corroding metallic probe with good electric conductivity, such as a stainless steel or a titanium probe, preferably a coated titanium probe. Preferably the position of the probe is adjustable.

Any suitable electrolyte may be placed in the vessel but preferably the electrolyte is saline solution.

The adapter of the vessel plate should be provided with means for securement of a coated metal object thereto. In one embodiment, the metal object is secured to the adapter of the vessel plate by a vacuum pulling the object onto the perimeter and secondary seals. In another embodiment, the metal object may be mechanically fastened to the adapter, for example by magnets and/or one or more clamp(s).

In a preferred embodiment of the present invention, the metal object is secured by the application of a vacuum.

Preferably, the secondary seal is provided on a raised area, for example being in the form of a rim or lip extending from the base of the adapter surrounding the at least one aperture that comprises a target area outlet. The target area is a selected, smaller region of the metal object, such as a rivet area. Preferably, an annular rim is provided, the secondary seal being mounted on the annular rim with the target area outlet surrounded by the rim and secondary seal. The raised area is preferably made from an insulating material, preferably one having non-stick properties such as a polytetrafluoroethylene PTFE, especially Teflon™.

In a preferred embodiment, the test chamber is provided with a hollow shaft for application of a vacuum and the adapter is provided with a second outlet spaced apart from the target area outlet. More preferably, the second outlet is funnel shaped, preferably being in fluid communication with a tube. Dependent upon the orientation of the test chamber, this outlet with tube serves to evacuate the target area and assist in sealing of the lid to the vessel plate or removes any electrolyte that should manage to enter to target area. It is preferable for the length of the tube to be substantially U or J-shaped, and optionally be a helical tube.

Optionally, a drainage channel is provided in the base of the adapter to direct fluid from the target area to the second outlet, thereby enabling any electrolyte to be directed from a vicinity of the target area of the lid back into test chamber. For example the base may slope slightly downwardly from the target area to the second outlet. Preferably, the sloped area is a contained area within the base, for example wherein the sloped area is defined by a recessed area of the base.

In another preferred embodiment of the present invention, the perimeter of the adapter is provided with spaced apart guide members to assist in accurately positioning the metal object on the seals of the adapter of the vessel plate. For example, the guide members may be projections extending outwardly from the vessel plate around the perimeter at spaced apart intervals. More preferably, at least some of the projections are resilient whereby the resilient nature of one or more of the projections serves to direct the metal object into position on the adapter.

More preferably, the guide members comprise at least one spring-mounted ceramic ball, especially a series of spaced apart spring-mounted ceramic balls. The resilience of the springs may differ depending upon the location of the guide member around the perimeter of the adapter.

The vessel plate according to the first aspect of the present invention and the enamel rater end adapter according to the second aspect of the invention may be incorporated into a manual, semi-automatic or automatic enamel rater system as is known in the art. For example, the enamel rater may be connected to a vacuum generator. The system may include other features such as an automatic vacuum control, compressed air source and/or a filter regulator. Preferably, current measured during operation of the device is displayed on an enamel rater digital display. Alternatively, the meter may be analog or the measured values may be sent directly to a data collection system as is known in the art.

BRIEF DESCRIPTION OF THE DRAWINGS

For a better understanding of the present invention and to show more clearly how it may be carried into effect, reference will now be made by way of example only to the accompanying drawings in which.

DETAILED DESCRIPTION

Figure 1:
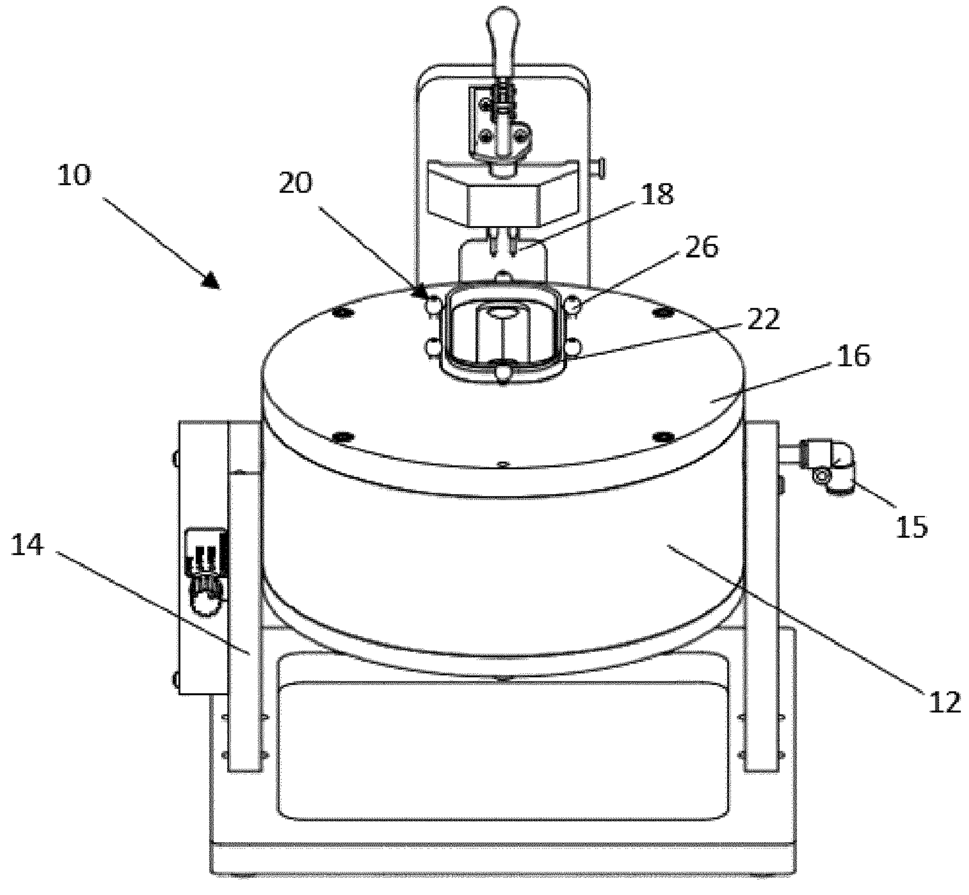
FIG. 1 is a perspective view of an end adapter of an apparatus for enamel rating a lid according to an embodiment of one aspect of the present invention.

The present invention provides an apparatus to enamel rate a selected, smaller region of a metal object, particularly but not exclusively the rivet area of an easy opening end/lid of a food or beverage container. In principle, this is achieved by an electrolyte vessel of an enamel rater, in particular the vessel plate, being adapted to direct electrolyte specifically to an area that requires testing, with the rest of the object being kept dry and separate from the area to be tested.

Prior art enamel raters are known for testing various metal objects, including cans, metal sheets, lids and so on. The apparatus comprises a vessel for holding an electrolyte and a vessel plate fixedly secured to the vessel, the plate being adapted to receive the metal object to be tested. For example, in the case of a can lid, the vessel plate may be provided with correspondingly shaped hole having a circumferential seal. The lid is fitted over the seal and a vacuum is applied to secure the lid on to the plate. An electrode is moved into contact with the lid and the whole vessel is inverted so that electrolyte flows into contact with the lid sealed within the hole of the plate. A constant voltage is applied and the enamel rater uses electrolysis to detect a current between the electrodes. If there is a loss of integrity in the coating on the can lid, a current will be detected due to the exposure of metal on the lid.

It is desirable to be able to check smaller areas of such objects without having to expose the entire object, such as the whole internal surface of the can lid, to the electrolyte. For example, easy opening lids are normally checked in their entirety but it is the areas of the lid that experience the greatest mechanical deformation during the lid manufacturing process that are most prone to having issues with the coverage of the lacquer. For an easy opening lid, the area with the largest deformation is the rivet area where a ring pull for easy opening is riveted onto the rest of the lid. The present invention achieves this by providing an apparatus that can form a second sealed area around a smaller target region and delivers electrolyte to this sealed target area.

Embodiments of the present disclosure will now be described by way of example only and with reference to the accompanying drawings in which like features are denoted with the same reference numerals.

Figures 2A, 2B:
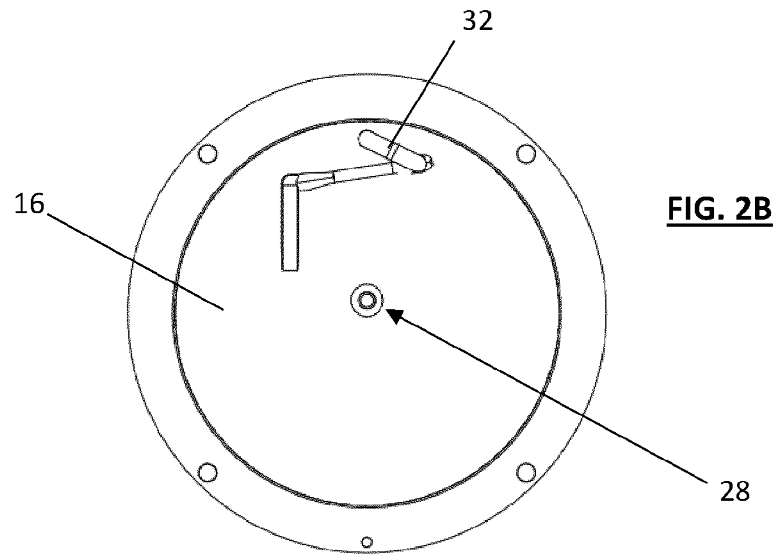
FIG. 2A is a top view of the vessel plate of the apparatus shown in FIG. 1 showing the lid adapter according to an embodiment of another aspect of the present invention.
FIG. 2B is a bottom view of the vessel plate shown in FIG. 2A.
Figure 2C:
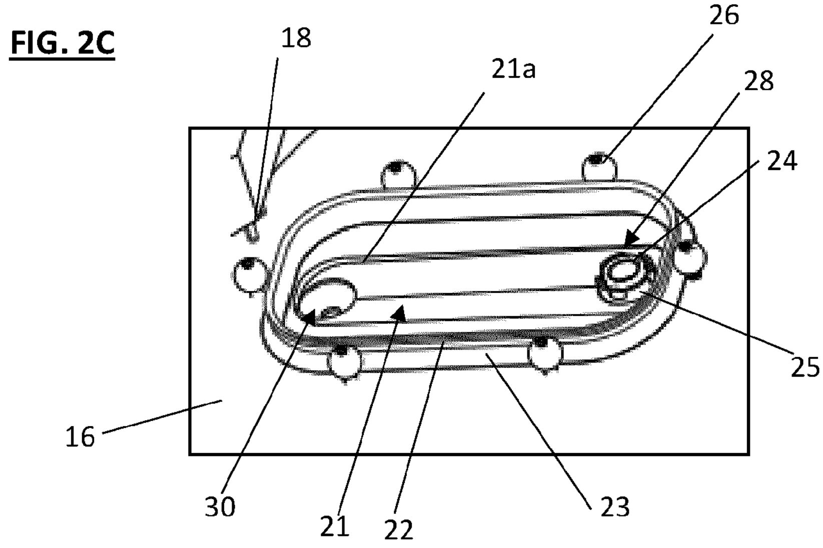
FIG. 2C is a detailed upper side perspective view of the lid adapter shown in FIG. 2A.
Figure 2D:
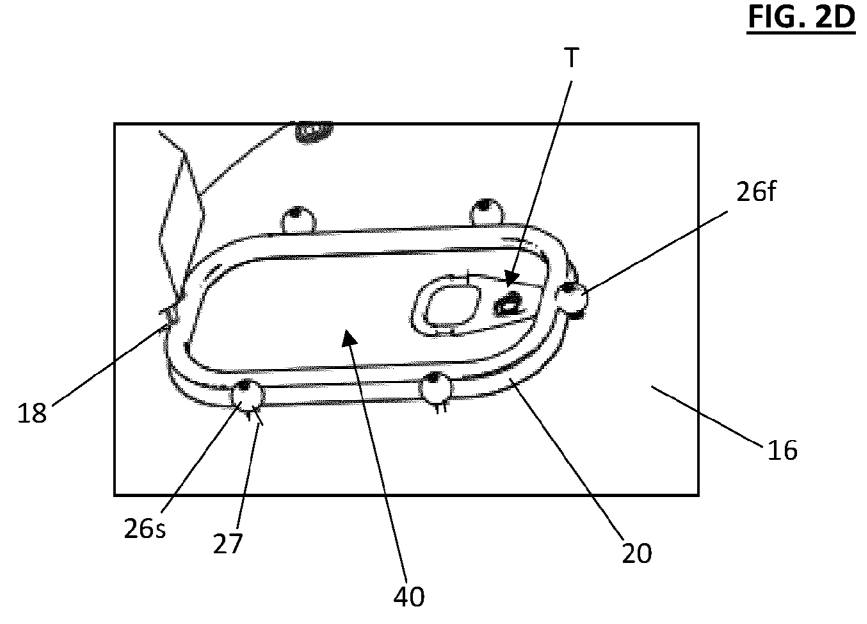
FIG. 2D is an upper side perspective view of the lid adapter shown in FIG. 2C shown with an end cap or lid attached thereto.
Figure 2E:
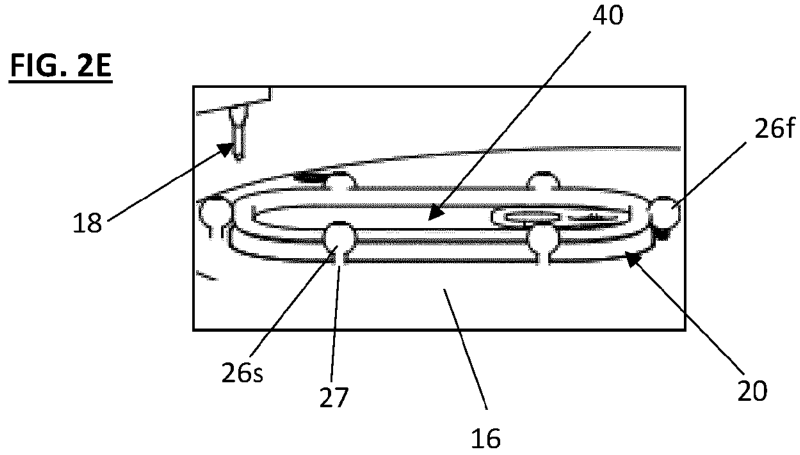
FIG. 2E is a side view of the lid adapter shown in FIG. 2C, shown with an end cap or lid attached thereto.

FIGS. 1 to 2E of the accompanying drawings illustrates one embodiment of an enamel rating apparatus according to an aspect of the present invention. The enamel rating apparatus includes an end adapter 10 having a main electrolyte-containing vessel 12 rotatably mounted on a stand 14, an electrode (not shown) penetrating the vessel wall and immersed in the electrolyte, height adjustable contacts 18 and a top plate 16 that is fixedly securable to the vessel 12, for example by magnetic or other suitable fasteners. The top plate 16 forms another aspect of the invention and includes a can lid adapter 20 that is configured to allow selective delivery of electrolyte from the vessel 12 to a target area T of a can lid 40. The vessel is also provided with a hollow vacuum shaft 15 (see FIG. 1) to enable a vacuum to be applied during use. In the illustrated embodiment, the lid adapter has a continuous side wall 23 extending outwardly from an upper surface of the top plate, the wall being in in the general shape of an ovoid to correspond with the profile of a can lid 40 but it is to be appreciated that any shape of adapter may be provided depending upon the shape of the object to be held therein, for example for a circular can lid, a lid adapter 20 would be provided having a circular perimeter wall.

The can lid adapter 20 has a base 21, preferably formed as part of the top plate 16 and the upper surface of the side wall 23 is provided with a continuous perimeter seal 22. Guide members 26 (further details of which are provided below) are provided at spaced apart intervals around the outer edge of the perimeter seal 22 and the base 21 is provided with a raised area 25 with secondary seal 24 surrounding a target area outlet 28. The raised area is preferably formed from an insulating, non-stick polymer, such as PTFE preferably Teflon™. A second outlet 30 in the form of a funnel is provided in the base of the lid adapter spaced apart from outlet 28, preferably provided at the opposing end to the first target area outlet 28, the funnel having a helical U-shaped tube 32 attached to it extending from the underside of the plate 16 into the vessel 12. A drainage channel 21*a* is also formed in the base 21 for directing fluid towards the outlet funnel 30.

FIGS. 2D, 2E and 3A to 3C illustrate operation of the end adapter of the enamel rater apparatus shown in FIGS. 1 to 2C. A can lid 40 with rivet area T to be rated by the apparatus is placed over the side wall 23 of the lid adapter 20 to sit on the upper surface of the perimeter seal 22. Guide members 26 comprising spring mounted ceramic balls 26 assist in the accurate placement of the can lid to ensure that the rivet area T (see FIGS. 3A to 3C) lies over the raised area 25 with secondary seal 24. In the illustrated embodiment the spaced apart guide members 26 are positioned to the rear, sides 26*s* and to the front 26*f* of the adapter. The guide members 26 are mounted on springs 27 with the spring of the front member 26*f* being of a higher resilience than the other springs. In this manner, the guide member at the front can be manually moved to allow placement of the lid between the other guide members on the perimeter seal and is then released to urge the lid into the correct position on the adapter, thus ensuring correct centering of the lid with respect to the lid adapter. This is important to ensure that the small target area T to be rated, such as the rivet area, is mounted in line with the raised area 25 with secondary seal 24.

Once the lid is secured onto the lid adapter on the plate of the vessel, the contacts 18 are lowered into contact with the lid 40 and a vacuum is applied via the vacuum shaft 15. When vacuum is applied through shaft 15, air is removed from under the lid through the U-shaped tube member 32, pushing the lid firmly onto the adapter of the vessel plate. This causes the lid to be sucked onto the perimeter seal 22 and the rivet target area T to be sucked onto the secondary seal 24 surrounding the outlet 28. Vacuum also travels through opening 28 surrounded by the secondary seal, further assisting retention of the lid on the plate. The vessel is then rotated through 180 degrees (see arrows in FIGS. 3B and 3C) so that the plate 16 is now at the bottom of the vessel with the adapter 20 and can lid 40. This allows electrolyte 50 from the vessel 12 to enter only the rivet area T of the adapter via outlet 28, with the secondary seal 24 preventing the electrolyte from contacting the rest of the lid. If any electrolyte does escape via the seal, it is immediately sucked through the funnel outlet 30 and through the helical tube 32 back into the body of the vessel. In this manner, the target area T may be enamel rated independently of the rest of the lid. The use of a non-stick material for the raised area 25 substantially eliminates any air bubbles that may form around this area during inversion of the vessel which would detrimentally affect the readings produced during the enamel rating process. Once testing is complete, the vessel is rotated to the starting position, the electrodes lifted away from the lid, the vacuum is released, thereby enabling the can lid 40 to be removed from the lid adapter.

Figure 4:
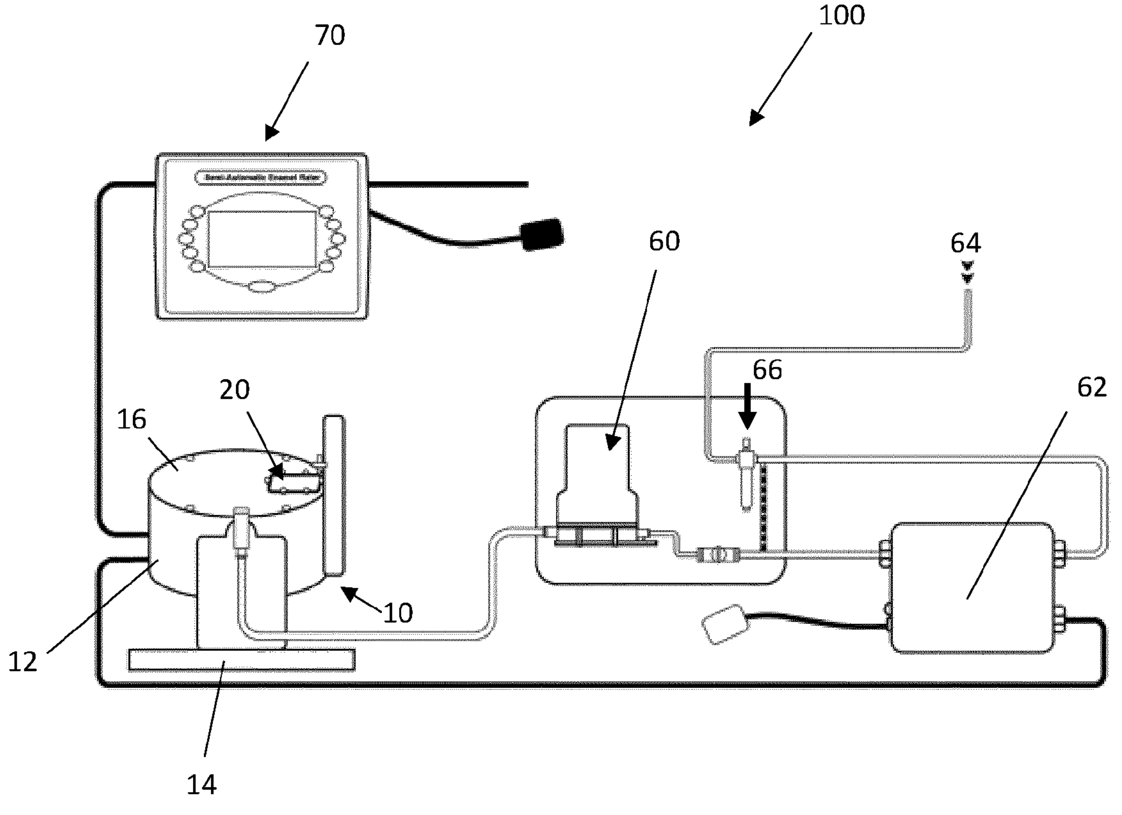
FIG. 4 is a schematic diagram of an enamel rater apparatus incorporating an end adapter according to an embodiment of an aspect of the present invention.

FIG. 4 of the accompanying drawings illustrates an enamel rater apparatus 100 incorporating the end adapter 10 of the invention as hereinbefore described wherein identical features already discussed are provided with the same reference numerals. The end adapter 10 of the enamel rater apparatus 100 is connected to vacuum generator 60 with automatic vacuum control 62 for automatic triggering of the vacuum generator and having a compressed air source 64 and filter regulator 66. The current measured during operation of the device is displayed on semi-automatic enamel rater digital display 70 or may be displayed on any other current measuring device.

It is to be appreciated that any shape of adapter could be provided for receiving a correspondingly-shaped object with the adapter being provided with a secondary sealed area positioned on the adapter to allow enamel rating of a particular target area of the object only. For example, with reference to FIG. 4, a system 100 could be provided with standard components but with a series of different top plates 16 for enamel rating different rivet areas of lids, or other small areas of ends, caps, flat sheets, domes etc., as desired. Ideally, the plates 16 are magnetically held to the vessel 12 to enable quick and easy changing of the plates. The apparatus 100 may also be provided with other optional features, such as sensors for self-checking of electrical contacts before every test, a water separator to avoid electrolyte getting into the air supply and an integrated calibration verification switch as are known in the art.

The illustrated embodiments secure the object to the vessel plate of the end adapter 10 of the enamel rater by the application of a vacuum. While this mechanism of attachment is preferred, it is to be appreciated that the enamel rater apparatus of the present invention may also be provided with alternative means for attaching the metal object to the vessel plate, such as mechanical means including magnets and/or a clamping mechanism. Targeting of a small area of the object for enamel rating is achieved in the same manner, i.e. by applying a secondary seal around the target area for delivery of electrolyte thereto in the inverted position.

Figure 3A:
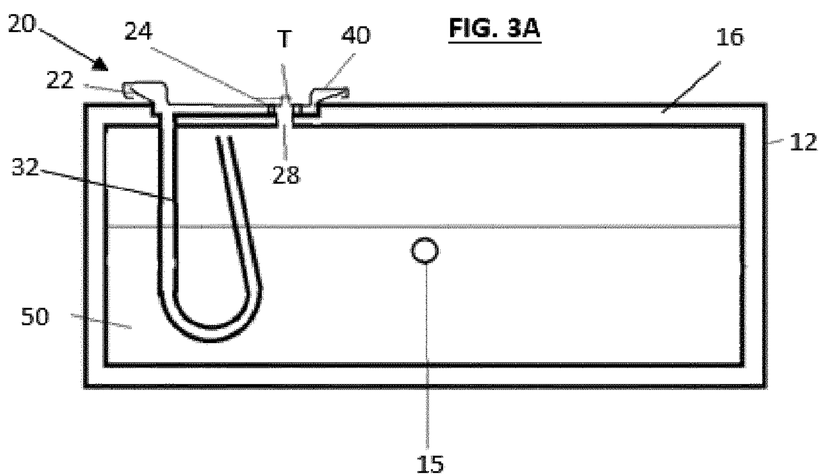
FIGS. 3A to 3C are schematic cross-sectional drawings of an apparatus for enamel rating an end cap or lid according to an embodiment of one aspect of the present invention, illustrating directed wetting of the area of the end cap or lid to be enamel rated.
Figure 3B:
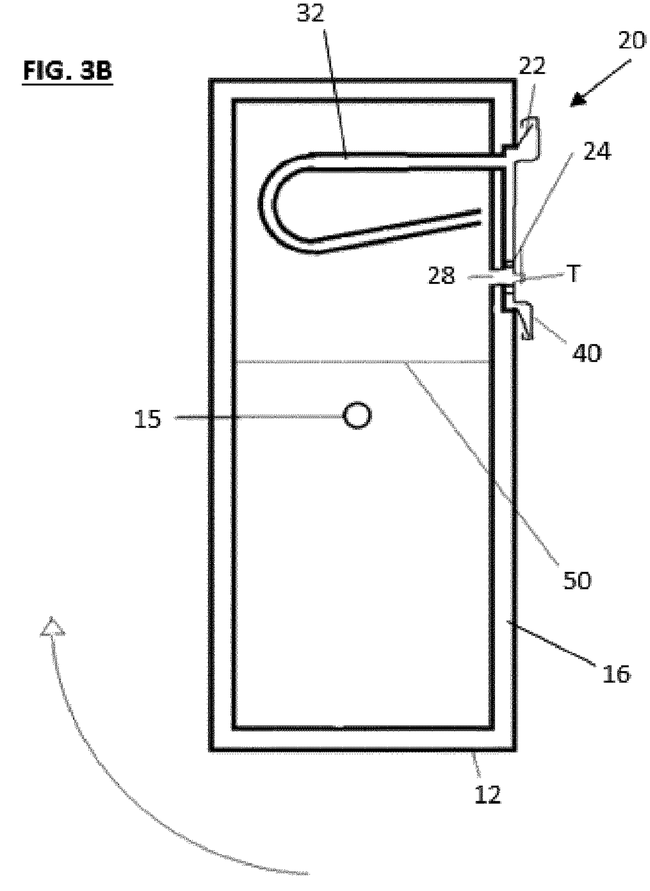
Figure 3C:
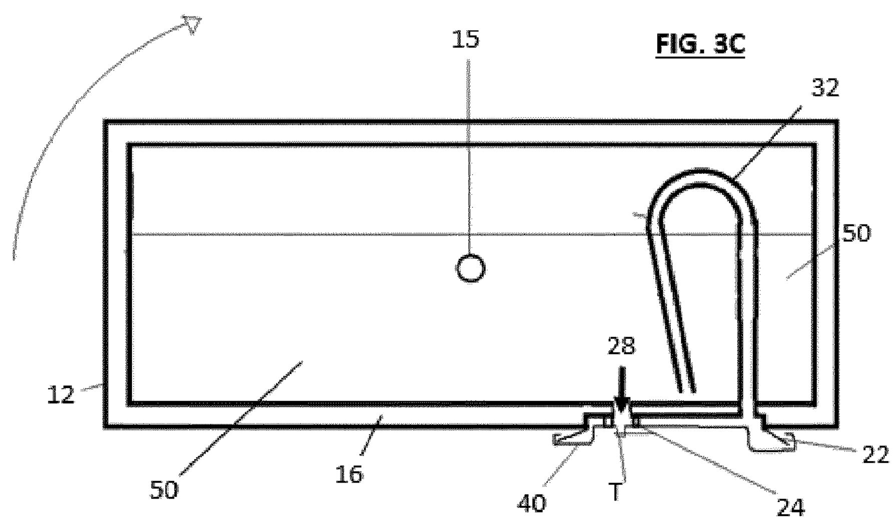
Figure 5A:
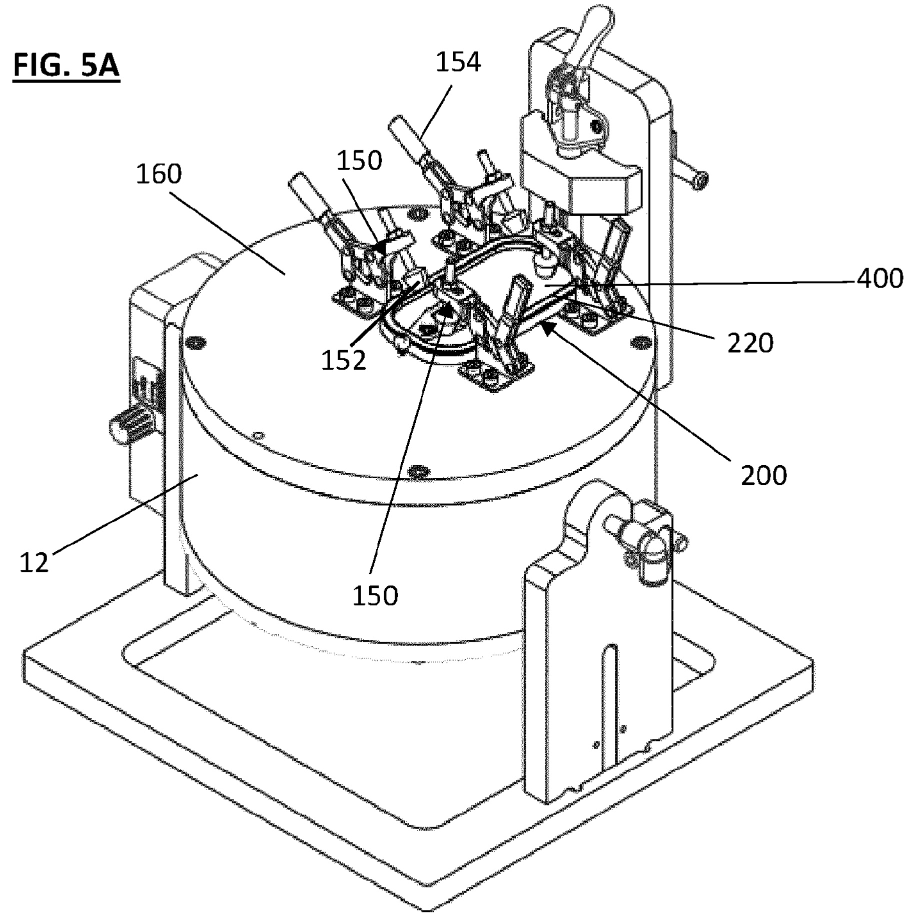
FIG. 5A is a perspective view of an end adapter of an enamel rater apparatus incorporating an alternative embodiment of the present invention, shown with a lid fully secured to the lid adapter of the vessel plate.
Figures 5B, 5C:
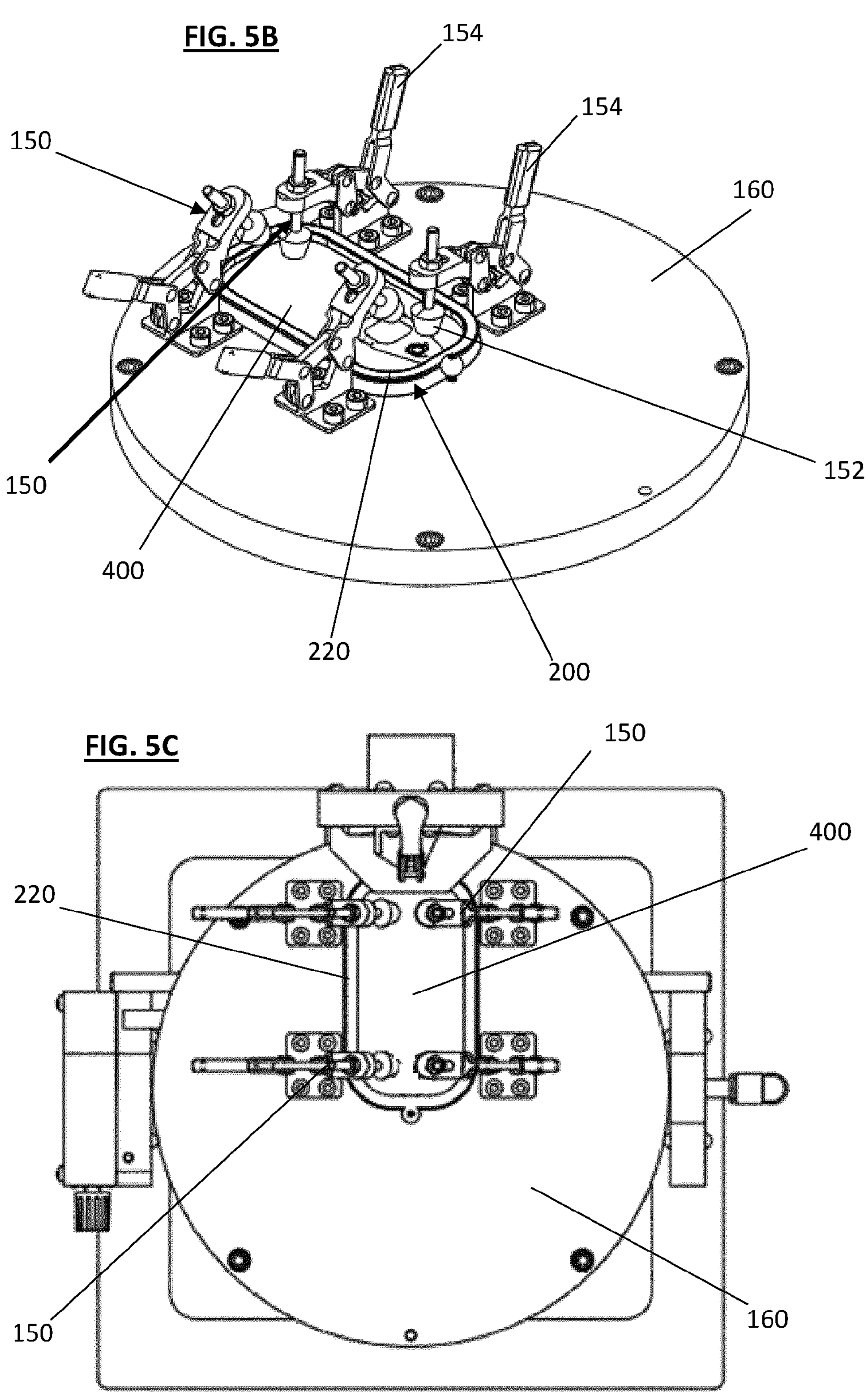
FIG. 5B is a perspective view of the vessel plate of FIG. 5A, shown with the lid partially secured to the lid adapter of the vessel plate.
FIG. 5C is a top view of the end adapter shown in FIG. 5A.

FIGS. 5A to 5C of the accompanying drawings illustrate one embodiment of an alternative can lid adapter 200 for installation within an end adapter of an enamel rater apparatus of the present invention. In this embodiment, the lid 400 is not attached to the vessel plate 160 by a vacuum seal, instead being held on by mechanical means, such as a plurality of clamps 150 that push the lid onto the perimeter seal 220 of the lid adapter 200 and into contact with the secondary seal (not visible) around the target (e.g. rivet) area. As illustrated, each clamp 150 is secured to the vessel plate 160 adjacent the lid adapter 200 and has a lever 154 for raising and lowering the clamp and a rubber foot 152 for contacting the surface of the lid. Spring-mounted ceramic balls may also be provided for guiding the lid into position on the lid adapter, prior to lowering of the clamps. Once the lid is secured by the clamps, the vessel 12 can then be inverted (as illustrated in FIG. 3C) so that electrolyte just enters the rivet area of the lid. Once the enamel rating has been carried out, the vessel is rotated and the lid removed by removal of each clamp.

It is to be appreciated that a different number and arrangement of clamps 50 may be used to secure the lid to the lid adapter. A single lever mechanism may also be used to raise and lower multiple clamps.

The present invention allows a lid or other object to be securely attached to an enamel rater but only a target region, such as a rivet area, of the object gets wetted by electrolyte and thus is the only part of the object to be measured for conductivity. In a preferred embodiment, the whole lid is held onto the vessel by a vacuum with a further seal separating off the target region from the rest of the lid whereby the target region may be in fluid communication with the electrolyte to enable this region to be enamel rated.

Further modifications to the enamel rater may be made without departing from the principles embodied in the examples described and illustrated herein.

The invention claimed is:

1. An enamel rater vessel plate for attachment to a test chamber of an enamel rater apparatus, the vessel plate comprising a main body configured as a lid for attachment to a test chamber, the vessel plate having a target area adapter configured to receive a metal object therein, the target area adapter comprising a base and a perimeter wall extending outwardly from the vessel plate to provide a raised area configured to receive the metal object, the perimeter wall having a seal mounted thereon, the base of the target area adapter having at least one aperture surrounded by a secondary seal, wherein the secondary seal is provided on a raised area surrounding the at least one aperture the at least one aperture forming a target area outlet, and the raised area is in the form of a rim or lip extending from the base of the target area adapter surrounding the target area outlet.

2. An enamel rater vessel plate as claimed in claim 1, wherein a vacuum source is provided to pull and secure the metal object onto the perimeter and secondary seal of the target area adapter of the vessel plate.

3. An enamel rater vessel plate as claimed in claim 1, wherein the metal object is mechanically fastened to the target area adapter.

4. An enamel rater vessel plate for attachment to a test chamber of an enamel rater apparatus, the vessel plate comprising a main body configured as a lid for attachment to a test chamber, the vessel plate having a target area adapter configured to receive a metal object therein, the target area adapter comprising a base and a perimeter wall extending from the vessel plate to provide a raised area configured to receive the metal object, the perimeter wall having a seal mounted thereon, the base of the target area adapter having at least one aperture surrounded by a secondary seal, wherein the secondary seal is provided on a raised area surrounding the at least one aperture, the at least one aperture forming a target area outlet, wherein the target area adapter is provided with a second outlet spaced apart from the target area outlet.

5. An enamel rater vessel plate as claimed in claim 4, wherein the second outlet is funnel shaped and is in fluid communication with a tube.

6. An enamel rater vessel plate as claimed in claim 4, wherein the second outlet is in fluid communication with a tube, wherein a length of the tube is selected from a substantially U-shaped, J-shaped and a helical shape.

7. An enamel rater vessel plate as claimed in claim 4, wherein a drainage channel is provided in the base of the target area adapter to direct fluid from a target area to the second outlet.

8. An enamel rater vessel plate as claimed in claim 1, wherein the perimeter of the target area adapter is provided with spaced apart guide members to assist in accurately positioning the metal object on the seals of the target area adapter of the vessel plate.

9. An enamel rater vessel plate as claimed in claim 8, wherein the guide members are projections extending outwardly from the vessel plate around the perimeter at spaced apart intervals, wherein at least some of the projections are resilient whereby a resilient nature of one or more of the projections serves to direct the metal object into position on the target area adapter.

10. An end adapter of an enamel rater apparatus, the end adapter comprising a test chamber for receiving an electrolyte therein, an electrode extending into the electrolyte and an enamel rater vessel plate as claimed in claim 1, the main body of the vessel plate having at least one fastener for securely attaching the plate to the test chamber of the end adaptor.

11. An end adapter as claimed in claim 10, wherein the at least one fastener comprises as least one magnet.

12. An end adapter as claimed in claim 10, further comprising a stand for supporting at least part of the end adapter which is manually or automatically rotatable to enable inversion of the chamber vessel.

13. An end adapter as claimed in claim 10, wherein the test chamber is provided with a hollow shaft for application of a vacuum.

14. An end adapter of an enamel rater apparatus, the end adapter comprising a test chamber for receiving an electrolyte therein, an electrode extending into the electrolyte and an enamel rater vessel plate as claimed in claim 4, the main body of the vessel plate having at least one fastener for securely attaching the plate to the test chamber of the end adaptor.

15. An end adapter as claimed in claim 14, wherein the at least one fastener comprises as least one magnet.

16. An end adapter as claimed in claim 14, further comprising a stand for supporting at least part of the end adapter which is manually or automatically rotatable to enable inversion of the chamber vessel.

17. An end adapter claimed in claim 14, wherein the test chamber is provided with a hollow shaft for application of a vacuum.

* * * * *